(12) United States Patent
Briancon et al.

(10) Patent No.: US 11,416,896 B2
(45) Date of Patent: *Aug. 16, 2022

(54) CUSTOMER JOURNEY MANAGEMENT ENGINE

(71) Applicant: Cerebri AI Inc., Austin, TX (US)

(72) Inventors: Alain Charles Briancon, Austin, TX (US); Jean Joseph Belanger, Austin, TX (US); James Cvetan Stojanov, Austin, TX (US); Christopher Michael Coovrey, Austin, TX (US); Pranav Mahesh Makhijani, Austin, TX (US); Gregory Klose, Austin, TX (US); Max Changchun Huang, Austin, TX (US); Mounib Mohamad Ismail, Austin, TX (US); Michael Henry Engeling, Austin, TX (US); Hongshi Li, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,235

(22) Filed: Jun. 18, 2021

(65) Prior Publication Data
US 2022/0044283 A1 Feb. 10, 2022

Related U.S. Application Data

(63) Continuation of application No. 16/657,676, filed on Oct. 18, 2019, now Pat. No. 11,068,942.
(Continued)

(51) Int. Cl.
*G06Q 30/00* (2012.01)
*G06F 17/00* (2019.01)
(Continued)

(52) U.S. Cl.
CPC ....... *G06Q 30/0269* (2013.01); *G06K 9/6267* (2013.01); *G06K 9/6297* (2013.01); *G06N 3/088* (2013.01); *G06N 20/20* (2019.01)

(58) Field of Classification Search
CPC .......... G06Q 30/0269; G06Q 30/0272; G06N 20/20; G06N 3/088; G06N 5/003;
(Continued)

(56) References Cited

U.S. PATENT DOCUMENTS 6,430,539 B1 * 8/2002 Lazarus ................. G06Q 30/02
705/14.1
8,370,280 B1 * 2/2013 Lin ........................ G06N 20/00
706/12

(Continued)

FOREIGN PATENT DOCUMENTS

WO WO-2018075995 A1 * 4/2018 ............. G06N 20/00

OTHER PUBLICATIONS

Jason Brownlee, Improve Model Accuracy with Data Pre-Processing, Aug. 4, 2014, Machine Learning Mastery, https://machinelearningmastery.com/improve-model-accuracy-with-data-pre-processing/ (Year: 2014).*

(Continued)

*Primary Examiner* — Dipen M Patel
(74) *Attorney, Agent, or Firm* — Pillsbury Winthrop Shaw Pittman, LLP

(57) ABSTRACT

Provided is a process, including: obtaining a first training dataset, training a first machine-learning model on the first training dataset, obtaining a set of candidate question sequences, forming virtual subject-entity records, forming a second training dataset, training a second machine-learning model, and storing the adjusted parameters of the second machine-learning model in memory.

18 Claims, 5 Drawing Sheets

Related U.S. Application Data

(60) Provisional application No. 62/748,287, filed on Oct. 19, 2018.

(51) Int. Cl.

| | | |
|---|---|---|
| *G06N 20/00* | (2019.01) | |
| *G06Q 30/02* | (2012.01) | |
| *G06N 20/20* | (2019.01) | |
| *G06K 9/62* | (2022.01) | |
| *G06N 3/08* | (2006.01) | |

(58) Field of Classification Search
CPC ...... G06N 3/006; G06N 3/0445; G06N 7/005; G06N 5/022; G06K 9/6297; G06K 9/6267; G06K 9/6259
USPC ...................................................... 705/14.66
See application file for complete search history.

(56) References Cited

U.S. PATENT DOCUMENTS

| | | | | |
|---|---|---|---|---|
| 9,015,084 | B2* | 4/2015 | Thieberger | G06K 9/6256 |
| | | | | 706/12 |
| 9,569,729 | B1* | 2/2017 | Oehrle | G06Q 10/063 |
| 10,366,346 | B2* | 7/2019 | Achin | G06N 20/00 |
| 10,373,177 | B2* | 8/2019 | Vijayaraghavan | |
| | | | | G06Q 30/0201 |
| 10,496,927 | B2* | 12/2019 | Achin | G06N 5/02 |
| 2007/0219978 | A1* | 9/2007 | Myers | H04W 4/00 |
| | | | | 707/999.005 |
| 2011/0054960 | A1* | 3/2011 | Bhatia | G06F 16/958 |
| | | | | 715/243 |
| 2011/0082824 | A1* | 4/2011 | Allison | G06Q 10/10 |
| | | | | 706/46 |
| 2014/0222506 | A1* | 8/2014 | Frazer | G06Q 30/02 |
| | | | | 705/7.29 |
| 2015/0134413 | A1* | 5/2015 | Deshpande | G06Q 30/0205 |
| | | | | 705/7.31 |
| 2015/0356591 | A1* | 12/2015 | Fano | G06N 99/00 |
| | | | | 705/14.27 |
| 2016/0048766 | A1* | 2/2016 | McMahon | G06Q 40/08 |
| | | | | 706/12 |
| 2016/0170997 | A1* | 6/2016 | Chandrasekaran | G06F 16/243 |
| | | | | 707/732 |
| 2018/0233130 | A1* | 8/2018 | Kaskari | G06N 3/084 |
| 2018/0330258 | A1* | 11/2018 | Harris | G06N 5/022 |
| 2019/0020670 | A1* | 1/2019 | Brabec | G06N 7/005 |
| 2019/0080347 | A1* | 3/2019 | Smith | G06N 20/00 |
| 2019/0138643 | A1* | 5/2019 | Saini | G06F 16/2474 |

OTHER PUBLICATIONS

Gondek et al., A framework for merging and ranking of answers in DeepQA, May/Jul. 2012, Digital Object Identifier: 10.1147/JRD.2012.2188760, IBM, https://ieeexplore.ieee.org/stamp/stamp.jsp?tp=&arnumber=6177810 (Year: 2012).*

Apte et al., Segmentation-Based Modeling for Advanced Targeted Marketing, Aug. 26, 2001, ACM New York, NY, USA ©2001, ISBN: 1-58113-391-X Order No. 618011 doi>10.1145/502512.502573, https://dl.acm.org/doi/pdf/10.1145/502512.502573?download=true (Year: 2001).*

Supervised and unsupervised learning, 2004, neural networks with java, https://www.nnwj.de/supervised-unsupervised.html (Year: 2004).*

Lally et al., WatsonPaths: Scenario-Based Question Answering and Inference over Unstructured Information, 2017, Association for the Advancement of Artificial Intelligence, ISSN 0738-4602 (Year: 2017).*

Gliozzo et al., Building Cognitive Applications with IBM Watson Services: vol. 1 Getting Started, Jun. 2017, IBM.com/redbooks, http://www.redbooks.IBM.com/redbooks/pdfs/sg248387.pdf (Year: 2017).*

Lee et al., Training IBM Watson using Automatically Generated Question-Answer Pairs, 2017, Hawaii International Conference on System Sciences, ISBN: 978-0-9981331-0-2, http://hdl.handle.net/10125/41356 (Year: 2017).*

Harshita Srivastava, How Did IBM Watson AI Really Win Jeapordy?, May 14, 2018, Magoosh, https://magoosh.com/data-science/how-did-ibm-watson-ai-really-win-jeapordy/ (Year: 2018).*

* cited by examiner

CUSTOMER JOURNEY MANAGEMENT ENGINE

CROSS-REFERENCE TO RELATED APPLICATIONS

This application is a continuation of U.S. patent application Ser. No. 16/657,676, titled "CUSTOMER JOURNEY MANAGEMENT ENGINE," filed 18 Oct. 2019, which claims the benefit of U.S. Provisional Patent Application 62/748,287, titled "CUSTOMER JOURNEY MANAGEMENT ENGINE," filed 19 Oct. 2018. Each afore-mentioned patent filing is hereby incorporated by reference in its entirety and for all purposes as if completely and fully set forth herein.

BACKGROUND

1. Field

The present disclosure relates to machine learning and, more particularly, optimizing selection of queries based on predicted effects on uncertainty about a system or entity being queried.

2. Description of the Related Art

Often, it is desirable to obtain information about a complex system by applying a stimulus to the system and observing a result. Examples include fuzz testing black-box software for which the source code is unavailable, and scan chain testing of integrated circuits. Other examples include efforts to query human actors and organizations thereof, for instance, with surveys and offers. Often, different stimuli produce different results from which a model of the system under test can be built.

In many cases, however, the cost of queries relative is relatively high, or the space of possible queries is relatively large. As a result, it may not be possible to test the systems response to every possible query. In such scenarios, there is a need to intelligently select a next best query in view of a query budget, what is currently know about the system under study, and what the next query is expected to reveal that is not currently known.

SUMMARY

The following is a non-exhaustive listing of some aspects of the present techniques. These and other aspects are described in the following disclosure.

Some aspects include a technique for dynamically determining a next data point to reduce a customer journey knowledge deficit (CJKD) based on time series data. The next data point may be in the form of a question-response pair that maximizes (either locally or globally) a reduction in the CJKD. Thus, aspects may include a technique for dynamically determining a next best question to reduce a CJKD, obtaining a response to the next best question, and reducing the CJKD based on time series data including the next best question and the obtained response to the next best question.

Some aspects include a process, including: obtaining, with one or more processors, a first training dataset, wherein: the first training dataset comprises a plurality of subject-entity records, the subject-entity records each describe a different subject entity; each subject entity is a different member of a first population of entities that have interacted over time with an actor entity; each subject-entity record describes attributes of a respective subject entity among the first population; each subject-entity record describes a time-series of events involving a respective subject entity among the first population; the events are distinct from the attributes; at least some of the events are question events that are caused by the actor entity; and at least some of the events are subject responses that are caused by a respective subject entity among the first population; training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population; obtaining, with one or more processors, a set of candidate question sequences including candidate question events to be potentially answered by the actor entity, the set including a plurality of different candidate question sequences; forming, with one or more processors, virtual subject-entity records by appending the set of candidate question sequences to time-series of at least some of the subject-entity records, wherein: a given subset of the virtual subject-entity records includes a plurality of virtual-subject entity records that each include at least part of a time-series from the same subject-entity record in the first training dataset; and at least some of the plurality of virtual-subject entity records in the given subset each have a different member of the set of candidate question sequences appended to the at least part of the time-series from the same subject-entity record in the first training dataset; forming, with one or more processors, a second training dataset by: predicting responses of the subject entities to at least some of the set of candidate question sequences with the first machine-learning model based on the virtual subject-entity records; and associating subject entities or attributes thereof with corresponding predicted responses in the second training dataset; training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the second machine-learning model in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
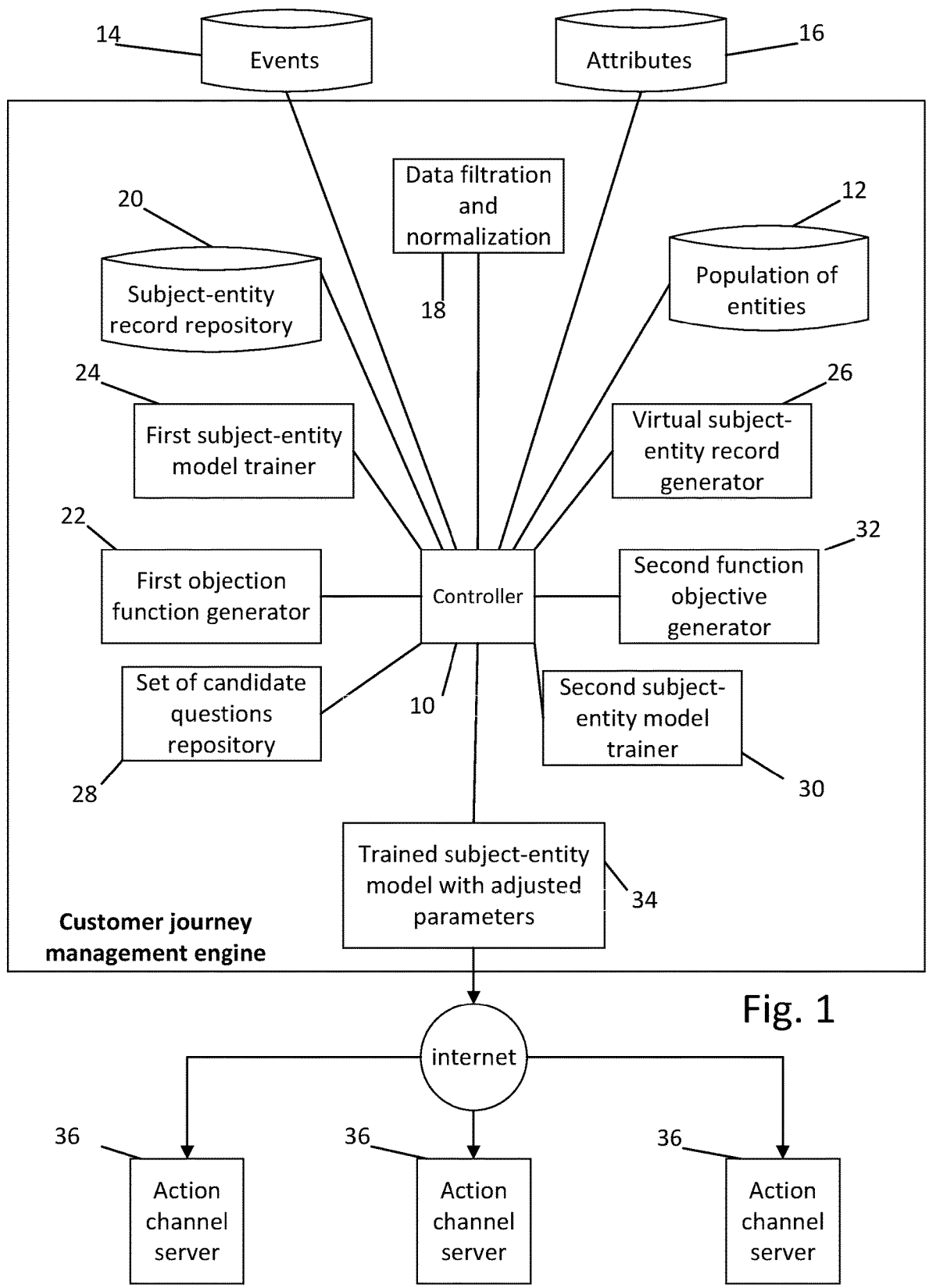
FIG. 1 is a block logical and physical architecture diagram showing an embodiment of a customer journey management engine in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of machine learning and data science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The present techniques are described with reference to probing customers (e.g., actual or candidate customers) by way of example. But, it should be emphasized that the present techniques have broader application. Use cases include scenarios where complex systems are probed under uncertainty with a relatively tight query budget, for example, in chip testing, software fuzzing, threat analysis, and electronic system debugging.

That said, the techniques are well suited for those seeking to influence human actors. Such users often ask various questions. Who are your customers? What do they want and how do they behave? What is driving their behavior? Which strategies will succeed? These are the questions that customer-focused enterprises ask constantly as they devise marketing strategies to drive increases in customer engagement and increases in sales. Some enterprises have sought to model customer behavior to better devise these marketing strategies. However, such modeling efforts are often ineffective at driving either increases customer engagement (e.g., with targeted online ad-space) or increased sales, especially at scale.

Complicating modeling efforts by an enterprise is the fact that a customer's commitment to a brand, product, product line (or the enterprise) is driven by not only by tangible, measurable factors but also by more intangible influences like a job change or competitor marketing that are not captured easily by the enterprise. Traditionally, surveys might be used to fill this gap.

Surveys may be used to gather information about consumers as a way to improve commerce, e.g., manually or electronically. A contracted survey might ask, for example, whether a past customer plans to purchase a new vehicle with a 1 year, 3 years, etc., whether the customer plans to purchase a same or different type of vehicle, what features on a given type of vehicle are most important to the customer, whether the customer plans to purchase their next vehicle of a particular brand, and so on. They can be long (census like) or short (like the Net Promoter Score). Even when segmentation is applied (men vs. women for instance), surveys suffer from a lack of customization based on context of customer interactions.

Older approaches that dynamically customize surveys, like SurveyMonkey's Skip Logic Branching feature, dynamically select subsequent survey questions in a computer interface based on previous answer, but the selection often misses the mark. In many cases, these existing techniques rely on relatively brittle, user-composed rules that fail to respond appropriately to unexpected types of customers and are premised on a relatively coarse-grained model of a population of consumers.

Further, some approaches used by companies to understand customers lack a way to quantify how a customer's behavior impacts the customers readiness, willingness, and desired experience when purchasing a product, such as a car or other product, on a continuing and consistent basis (e.g., by the microsecond, second, minute, hourly, daily, weekly, monthly, per interaction, depending on the context). In addition, some approaches fail to measure potential impact from customers on a customer-by-customer basis. For example, enterprises may use a "one size fits all" approach to advertising or customer experience rather than targeting customers (whether a person or a business) using a highly individualized approach.

None of the preceding discussion of deficiencies in earlier approaches should be read to suggest than any subject matter is disclaimed or that the present techniques may not be used on conjunction with traditional techniques.

In some embodiments, customer journeys (CJs) are used as a way to organize information about the way customer interact with businesses over time. Customer journeys may be discrete, unevenly sampled time series of customer events that contain a heterogeneous set of attributes and features. They may contain both unambiguous signals of commitment—like buying a new car—as well as more ambiguous signals of commitment, such as a monthly series of credit card purchases or contact with customer service. CJs have been observed to improve machine learning performance whether for recommendation systems and for customization of experience. As a result, CJs are expected to be helpful in driving sales through the effective recommendation of customized experiences, products, or the like. One such approach for CJs is described in U.S. patent application Ser. No. 15/456,059, titled BUSINESS ARTIFICIAL INTELLIGENCE MANAGEMENT ENGINE, the contents of which are incorporated by reference herein in their entirety. Using this approach, customer experience may be treated as a dynamic rather than a static factor. Thus, for example, customer experience may be a continuously managed signal (aka parameter) that can be used to decide, recommend, and trigger activities from a business to its customers and prospective customers.

In some embodiments, modeling (in program state of a machine-learning or operational research application) of customer journeys is utilized to determine a data point, such as a new event or events, like a question that may produce a response, or question-response pair, that minimizes a knowledge gap in the customer's journey. These outcomes may be modeled to determine a next best data point, i.e., a data point from a set of available data points that maximizes the reduction in the knowledge gap. Some embodiments may strike a balance between these objectives (producing a response, and minimizing knowledge gaps) that affords a more optimal approach to the multi-armed bandit problem than might be otherwise achieved. The next best data point may be thought of conceptually as a next best question, e.g., as measured by an objective function. In other words, the next best question and be thought of as question to ask a customer that best predicts whether a given event will occur within a given timeframe along their customer journey. In some cases, the next best question may not be inherently related to the knowledge gap which it fills. As an example, the next best question for the above example of purchasing a new car or an extended warranty may not be "do you intend to buy a new car?," but rather some other metric determined through modeling, such as whether the customer is confident in the future of the economy.

This may be applied to systems, whether single or multi-component, for which past and current customer decisions and events are tracked in an attempt to predict future outcomes, but there exists a knowledge gap. The information needed, in some embodiments, includes risk-related behavior of system components, its environment, and the people and systems it relates to, for the system under examination as well as similar systems.

Some aspects of the present techniques mitigate scaling challenges presented in commercially relevant use cases. Often, the goal of an enterprise (e.g., a business vendor or a service provider) is to efficiently and cost-effectively maintain a close relationship with each customer to meet those customers' needs and effect sales. But in some cases, the number of customers may be large, e.g., more than 10,000, more than a million, or more than ten million. An enterprise desires to understand what motivates a customer's actions, and to fill in knowledge gaps surrounds a customer's actions, to help (i) optimize or at least improve the economic value that the enterprise derives from the customer, (ii) provide offerings, products, and services tailored to the customer's needs, (iii) provide offerings with terms that cause the customer to finalize a transaction, and (iv) further develop offerings, products, and services such that they meet customer's needs over those of competitors.

In some embodiments, a series of techniques may be implemented via a controller 10 operating within a customer journey management engine 100, as shown in FIG. 1. In some embodiments, the computing environment of the customer journey management engine 100 may further include a population of entities 12 (e.g., in a database, or program state), gathering a plurality of events 14 (e.g., in a database, or program state), and a heterogeneous set of attributes 16 (e.g., in a database, or program state), subject-entity record repository 20 (e.g., in a database, or program state), and a plurality of action-channel servers 36, and a trained subject entity model 34. In some embodiments, the population of entities 12 may be filtered and normalized 18 to be stored in a subject-entity record repository 20.

A variety of different computing architectures are contemplated. In some embodiments, a plurality of the components of the customer journey management engine 100 may be hosted by different collaborating entities, for instance, in remote datacenters that communicate via the Internet, wired network, or other networks. In some embodiments, a plurality of the components of the computing environment 100 may be co-located within a network of a single entity, for instance co-located in a single datacenter. In some cases, the functionality described may be implemented on instances of the computing device of FIG. 3.

In some embodiments, the controller 10 may be configured to execute the process described below with reference to FIG. 2. In some embodiments, the controller 10 is operative to train models that account for the above-described dynamically select subsequent survey questions in a computer interface based on previous answers in which actions selected by the model are taken, in some cases under uncertainty, and in some cases, with stochastic responses from the environment. In some embodiments, the trained model may be operative to select such actions with a subset of the information that is available when training, for instance, with a subset of features about a current state of the environment for which an action is to be chosen in pursuit of an objective.

In some embodiments, the environment is characterized by one of a plurality of subject-entity records in the subject-entity record repository 20. In some embodiments, the environment may be customer for which actions (a set of questions) are selected to minimize a knowledge deficit or gap about the customer. The knowledge gaps, and scores therefor, may be identified for probed occurrence in the future of a particular event in the customer journey.

In some embodiments, each of the subject entity records may include a time series of events experienced by the corresponding subject entity. In some cases, the events may include actions taken by a system controlled by the controller 10 at the direction of the controller 10 based upon a trained model thereof. Non-limiting examples include affinity based matching models between customers and products, or the recommendations of future actions to optimize a defined KPI (key performance indicator), like profit, revenue, customer satisfaction scores, a default rate, a claim rate for insurance, or the like.

In some embodiments, a subject-entity record may include a time series of events experienced by the subject-entity or potentially experienced by the subject entity, such as exogenous events that may or may not have impinged upon the subject entity. In some cases, the time series of events are stored in a format that indicates a sequence of the events, for instance, with timestamps of each event. In some embodiments, the time series of events are stored in a format that indicates indicate sequence but not time (like a temporally ordered list), which is not to suggest that any other described feature is limiting.

In some embodiments, events may have other attributes, like an intensity of the events, a value indicating whether a person would participate in a questionnaire, an average number of questions a person may answer before feel annoyed, and the like for use cases in which humans are the subject.

In some embodiments, the customer journey management engine 100 may train a first machine-learning model based on a first training data set obtained from the subject-entity records. The first machine-learning model may be used by the customer journey management engine 100 to generate a set of candidate question sequences including candidate question events to be potentially answered by the actor entity (e.g. customer), the set including a plurality of different candidate question sequences. The first machine-learning model may be trained by adjusting parameters of the first machine-learning model to optimize a first objective function, using an objective-function generator 22 that indicates an accuracy of the first machine-learning model in predicting subsequent events in the time-series given prior events in the time-series and given attributes of subject entities.

In some embodiments, the customer journey management engine 100 is configured to form a set of candidate questions repository 28 based on the first subject-entity model trainer. The term "repository" is used broadly to include structured arrangements of data, such as in relational databases, NoSQL databases, data structures in program state (like key-value pairs, objects in an object oriented programming language, arrays, lists, semantic triple, RDF, and the like), documents (like hierarchical serialization data format documents, such as JavaScript object notation or extensible markup language documents), and the like. Some of these structures are described in U.S. Patent Application 62/856, 713/595220, titled OBJECT ORIENTED AI MODELING, the contents of which are incorporated by reference herein in their entirety.

A virtual training set that includes predicted responses to candidate actions may be formed via a virtual subject-entity record generator 26 by appending the set of candidate question sequences to time-series of at least some of the subject-entity records. The virtual training set may then be used by the customer journey management engine 100 to train a second machine-learning model 30 by adjusting parameters of the second machine-learning model to optimize a second objective function using a second objective function generator 32 that indicates an accuracy of the second machine-learning model in predicting the predicted responses in the second training set given attributes of subject entities corresponding to the predicted responses, as described in detail below with reference to FIG. 2.

In some embodiments, the output of the customer journey management engine 100 may effectuate various types of actions based on the adjusted parameters 34 obtained from the second machine-learning model 30. In some embodiments, those actions may be effectuated through a plurality of action channel servers 36. In some embodiments, the role of these components may be filled by a network-connected server configured to send messages or emails sent via email servers, text messages sent via text message servers, messages sent creating tasks in a customer-relationship management (CRM) system to contact a particular customer, messages sent to a printer that cause mailers to be printed, messages sent to a at auction server with a bid on an advertisement, a website server that customizes content for a particular customer's user account, and the like.

The customer journey management engine 100 may build a profile of each customer's preferences and learn via feedback which decisions are more likely by which types of people. In some embodiments, customer may not want to spend too much time to answer too many questions and teach the customer journey management engine about all of their preferences, and so instead the customer journey management engine may learn which of all the questions are the most important questions to ask in the context of the customer. Out of the universe of all questions the customer journey management engine may know about finding out about profiles, for instance the customer journey management engine may have learned there are three specific questions that are best for when the customer is trying to find a used car under $20,000. Alternately, there may be a completely different set of three questions to ask a customer who is interested in a new car below $20,000.

In some embodiments, customers may enter a number of questions they want to answer. The customer journey management engine 100 may try out new questions with customers to see if the questions turn out to be useful in minimizing the knowledge gap. Depending on the usefulness of a question in minimizing the knowledge gap, the customer journey management engine 100 determine a frequency of how often ask that question.

The customer journey management engine 100 may keep asking questions (e.g., by instructing the action channel servers to effectuate communications with consumers) until it determines it has a confidence higher than a threshold in what the customer wants. The customer journey management engine 100 may also stop sooner if it determines like it has already asked too many questions or there is a risk of annoying the customer. In some embodiments, the customer journey management engine 100 may ask at least a minimum number of questions to avoid the customer feeling that the customer journey management engine 100 has not acquired enough information from the customer to make an intelligent decision.

In some embodiments, the customer journey management engine 100 may have a mechanism to accommodate and respond to incorrect answers from a customer. Incorrect answers may result from the customer not understanding the question, not understanding the answer or not knowing how to answer to the question. If the bulk of the answers given by the customer support a particular decision, the customer journey management engine 100 may make that decision even though not all the customer's answers support that decision.

In some embodiments, the customer journey management engine 100 may provide other combinations of some subset of questions to minimize the knowledge gap more efficiently. The customer journey management engine 100 may utilize history of previous customer interactions with the customer journey management engine 100 to optimize a subset of questions and the order in which the questions are asked.

In some embodiments, the customer journey management engine 100 first computes the correlation of attributes between a given customer and the trained machine-learning model. After computing the correlation, the customer journey management engine 100 may determine the best next question to ask, or a plurality of questions to ask the customer based on the adjusted parameter of the trained machine-learning model.

In some embodiments, the customer journey management engine 100 may help a user make a decision through the use of a trained machine learning model. The process may begin with an initial question being asked by the machine learning model from the customer. The initial question may be received by the customer via an interface, where the ultimate decision may be based on the initial search terms, the dialog of questions and answers with the user, and the like. The customer may then be provided with a set of questions from the machine learning model and answers provided by the customer. The machine learning model may then provide a plurality of offers or suggestions to the customer based on the dialog and pertaining to the questions, such as a recommendation, a diagnosis, a conclusion, advice, and the like.

In some embodiments, a question may be in the form of a multiple choice question, a yes-no question, a rating, a choice of images, a personal question, and the like. The question may be a pseudo random question, such as a test question, an exploration question that helps select a pseudo random decision on the chance that the pseudo random decision turns out to be useful, and the like.

In embodiments, the question may not be asked directly to the customer, but rather determined from contextual information, such as through an IP address, the location of the customer, the weather at the customer's location, a domain name, related to path information, related to a recent download, related to a recent network access, related to a recent file access, and the like.

In embodiments, the customer journey management engine 100 may keep asking questions until a high confidence in a reduced set of decisions, such as a reduced set of decisions presented to the customer. The decision provided by the customer journey management engine 100 may be independent of the order of questions.

In some embodiments, the customer journey management engine 100 may provide an interface to interact with a customer. The customer journey management engine 100 may include several parts, some of which may be a web server, which may serve collections of code that collect, process, and render a single piece of content on a web site, e.g., one hosted by the web server, or content injected in a third party website. The website may include interfaces for end-users, staff members, and registered users to get decisions, edit the decisions, and view reports on system performance.

In some embodiments, the customer journey management engine 100 may employ various different techniques in the information retrieval process. The customer journey management engine 100 may parse of documents into fields containing text strings and extract concepts from the fielded text strings, where the concepts are nodes in a semantic network. The customer journey management engine 100 may further extend a semantic network with references to extracted concepts, and can index the semantic network with a combination of hierarchical, non-hierarchical, and linked inverted indices.

Figure 2:
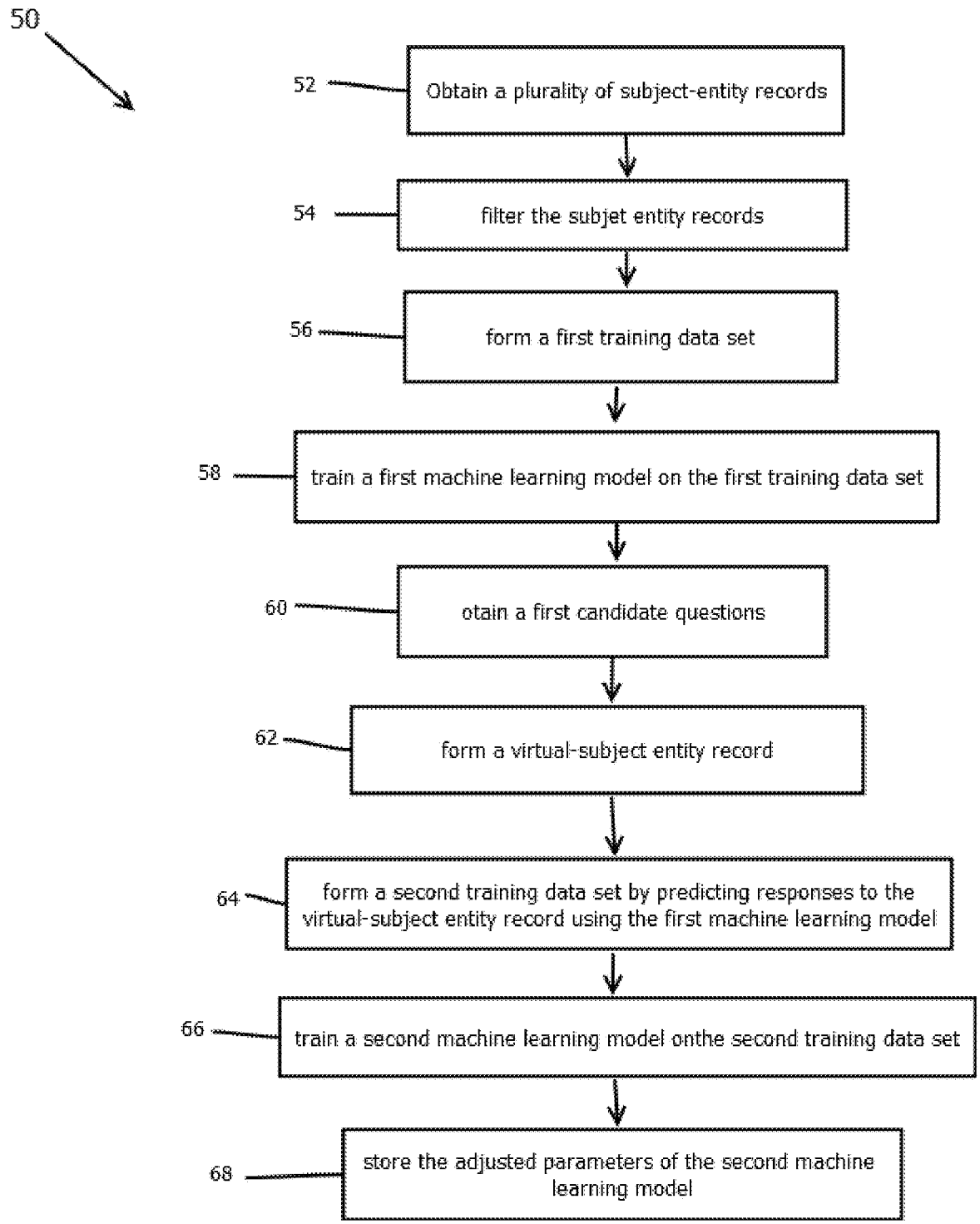
FIG. 2 is a flowchart showing an example of a process by which subsequent actions are selected in accordance with some embodiments of the present techniques.

In some embodiments, the customer journey management engine 100 may execute a process 50 shown in FIG. 2. In some embodiments, different subsets of this process 50 may be executed by the illustrated components of the customer journey management engine 100, and it should be noted that embodiments of the process 50 are not limited to implementations with the architecture of FIG. 1, and that the architecture of FIG. 1 may execute processes different from that described with reference to FIG. 2, none of which is to suggest that any other description herein is limiting.

In some embodiments, the process 50 and the other functionality described herein may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 50 includes obtaining a plurality of subject-entity records, as indicated by block 52, and filtering the subject-entity records, as indicated by block 54. In some embodiments, these operations may be performed by a data filtration and normalization sector shown in FIG. 1.

Filtration of the subject-entity records may be performed in various ways. Some embodiments may filter out the records with an ambiguous connection to the rest of the population of entities. In some embodiments, subject-entity records that do not include a target action may be filtered out and omitted from subsequent processing, thereby reducing the universe of subject-entity records to process and expediting operations. Some embodiments may further filter out subject-entity records lacking a causal relationship due to missing history of events or contradictory attributes. In some embodiments, the data filter and normalization 18 may further compress the data that is ingested by removing duplicate records.

In some embodiments, a first training data set 56 is prepared including a plurality of filtered subject-entity records. These records may describe different aspects and attributes of the subject-entities and interaction of subject-entities with an actor-entity over time. Some of the subject-entities may also include a time-series of events with various types of interactions with an actor-entity. It should be noted that the events may be distinct from attributes of a subject-entity.

In some embodiments, a time-series of events may include a respective subject-entity among a population of entities with a plurality of time-series sequences of events where a time-series sequence of events is an ordered sequence of two or more events. In some embodiments, the time-series of events may include a plurality of time-series sequences of events, where each time-series sequences of events is an ordered sequence of two or more events having same or similar event types. In some embodiments, the time-series of events may include a plurality of time-series sequences of events, where each time-series sequences of events is an ordered sequence of two or more events having one or more specified event types.

In some embodiments, event types may be stored in an ontology of event types that describes the interrelatedness, similarity, or both interrelatedness and similarity of different event types represented in the time-series of events.

Some of the events may include a question types of events presented to an actor-entity along with the response obtained from the actor-entity. In some embodiments, a question event may be an interactive user interface element for which a response within the user interface element is collected, which may be a selection or other user input. In some embodiments, a question event may be an advertisement, for which a response may be the interaction with a particular portion of the advertisement or the advertisement in general. In some embodiments, a question event may be an article or review about a product or product category, for which a response may be the interaction with a particular portion of the article or review or in general.

Some of the events may be subject responses that are caused by a respective subject entity among the population of entities. A response event may be a non-response, a canceled response, a direct response or answer, or an indirect response or answer indicated by a particular action from a set of actions. In some embodiments, a plurality of events may be responses corresponding to a plurality of question events regarding an actor-entity.

In some embodiments, the subject-entity may be an interaction with an actor-entity that has occurred within a specific time range or in a specific order among a plurality of other interactions with the actor-entity. in some embodiments, a time range may be a trailing time range, such as from a given start time, where the plurality of subject-entity records correspond to subject entities within a first population of entities that interacted with the actor entity within one or more days, weeks, months, or years as defined by the trailing time range before the given start time. In some embodiments, a time range may be a specific time range, such as times between two specific dates.

In some embodiments, a first machine learning model, as indicated by block 58, may be trained on the first training data set. Various types of training may be implemented, depending upon the type of model. In some embodiments, the model is a supervised machine learning model subject to offline training, or in some cases, such as those in which the search space of candidate actions is relatively large, the model may be a reinforcement learning model. Specific examples of each are described below.

Some embodiments, the model is responsive to various features that serve as input to the model, e.g., some indication of sequence (like order, a time-stamp, a time delta, a binary value indicating if the event occurred within some duration of time, a frequency), and in some cases, such features include durations of time between events. In some embodiments, the features include events in the event histories described above, along with attributes of subject-entities in the subject-entity records.

In some embodiments, the first machine learning model may be trained by adjusting parameters of the first machine-learning model to optimize a first objective function that indicates an accuracy of the first machine-learning model in predicting subsequent events in the time-series given prior events in the time-series and given attributes of subject entities. The model parameters may take a variety of different forms, depending upon the type of model, examples include weights and biases in a neural network architecture, division planes and sequence of dimensions to split in a decision learning tree, transition probabilities in a dynamic Bayesian network, or policies or value functions in a reinforcement learning model. Example models include recurrent neural networks, like long-short term memory (LSTM) models, dynamic Bayesian processes, Markov decision processes, hidden Markov models, multi-layer network classifiers, reinforcement learning models, decision trees, ensemble methods thereof (like random forests) and the like, none of which is to suggest that these list items or any other list herein describes mutually exclusive categories of items.

In some embodiments, the function over which the first subject-behavior model is optimized is an objective function, which as that term in broadly used herein, in some cases may be a reward function, a value function, a cost function, a fitness function, and error function, or the like.

In some embodiments, the parameters of the first machine learning model may be adjusted in an iterative process by which, at each epoch, the parameters are adjusted in a direction that the objective function indicates will tend to increase accuracy of the first machine learning model in predicting subsequent events in the event records ("predicting" as used herein includes explicit prediction of events such as predicting the best next question).

In some embodiments, a set of candidate question sequences may be obtained from the first machine learning model, as indicated by block 60. In some embodiments, a set of candidate question sequences may include candidate question events to be potentially answered by an actor entity.

A set of candidate question sequences may include a plurality of different sequences and a plurality of different question sets.

Some embodiments may generate the virtual subject-entity records, as indicated by block 62, by appending candidate actions (e.g. questions) to the subject-entity record event sequences. In some embodiments, the candidate actions are appended to a time-series from the same subject-entity record in the first training dataset. In some embodiments, a plurality of virtual-subject entity records in the given subset each have a different member of the set of candidate question sequences appended to the time-series from the same subject-entity record in the first training dataset.

In some embodiments, a different virtual subject-entity record may be generated for each of the candidate actions in the repository 28 for a given subject-entity record from the repository 20. For example, if there are five candidate actions, then in some embodiments, a single subject-entity record may result in five different virtual subject-entity records, each with a different candidate action appended to its event time series.

In some embodiments, virtual subject entity records may be generated with multiple candidate actions appended. In some embodiments, a sequence of candidate actions may be appended in a variety of different permutations, for example, in every permutation or combination of candidate actions in the repository.

In some embodiments, virtual subject-entity records may describe events that have not occurred, and thus are virtual, but include the candidate questions in the context of known histories of events and attributes that have actually occurred.

Some embodiments may form a second training data set by predicting responses provided by the first machine learning model to the questions of the virtual subject-entity records, as indicated by block 64 in FIG. 2. The second training data set may include responses of the first machine learning model to the questions of both the first training data set and the second training data set. In some embodiments, the second training data set may include predicted responses to some of the questions stored in the virtual subject-entity records.

In some embodiments, the second training set may be input into second subject-entity machine learning model trainer 30 shown in FIG. 1, as indicated by block 66. Different set of training may be applied depending upon the type of model in use. Any of the types of models described above may be applied, and in some cases a different type of model from that selected for the first machine learning model may be used.

The second machine-learning model may be trained on the second training dataset by adjusting parameters of the second machine-learning model to optimize a second objective function, using an objective function generator 32, that indicates an accuracy of the second machine-learning model in predicting the predicted responses in the second training set given attributes of subject entities corresponding to the predicted responses.

Some embodiments may store the adjusted parameters of the trained second machine-learning model in memory, as indicated by block 68. In some embodiments, the adjusted parameters of the trained second machine-learning model may be subsequently used to provide an optimized set of actions (e.g. questions) customized based on the history of events related to an actor-entity.

In some embodiments, a plurality of machine-learning models, having more than two models, may be used to further increase the accuracy of the model across each iteration responsive to next questions and responses.

Some embodiments create a customer journey in the form of an event timeline integrating the different events obtained or determined about a customer. For example, events may include customer interactions with the enterprise itself and other entities. Machine learning may be used to extract the appropriate patterns. The models built and trained with the journey time series may be used to score a next data point (e.g., event in the journey), and determine a next best data point that minimizes a knowledge deficit about the customer. Embodiments may determine a next best question for which a response to that question provides that data point, both of which may be events in the customer journey. Journeys may be encoded in memory as a set of time-stamped or sequenced entries in a record, each including an event and information about that event. In particular, the best (estimated) possible next data point (or set of data points), which may be presented as questions/responses, may be identified to meet a management objective of the customer journey, such as minimizing a knowledge deficit or gap about the customer, in some embodiments.

For continuous customer journey management, in some cases, it is beneficial for embodiments to address both traditional and non-traditional events. Such embodiments may rely on both traditional and non-traditional events, e.g., taken as input. Known (e.g., in an ontology in memory, or classifiable to such an ontology) events are easier to model than unknown events, but even for the former, it is difficult to account for all the actions and circumstances possibly contributing to them. Determining what contributes to an event is beneficial to model customer journeys.

Some embodiments manage (e.g., infer and effectuate decisions based on) customer journeys as a time series of events and actions taken (or not) within a system's context (this may include human, computing and other types of components) and implement a methodology to continuously assess whether knowledge gaps (e.g., a score on an index) exist in those customer journeys for which new data points (e.g., events) would minimize. The knowledge gaps, and scores therefor, may be identified for probed occurrence in the future of a particular event in the customer journey. The higher the knowledge gap, the less certain the model is about the probability of occurrence of a given event (or events) presenting itself or themselves in the customer journey in the future. In turn, data points that minimize knowledge gaps can be determined. These data points may be in the format of a question-response pair where the question and response (if any) are events that reduce the knowledge gap. A next best question may maximize a reduction in the knowledge gap relative to other questions in a set of questions, or strike an appropriate balance (as determined by an objective function) between driving the user to engage in some action and obtaining information by which future acts to that end may be more accurately targeted. The question may be posed to the customer and a response collected to fill in the knowledge gap. A "question" as discussed herein may not be an actual question in the narrowest sense (e.g., what is your favorite type of car), but rather an advertisement or some other means by which a user may indicate a particular response to the question, such as a user selecting a type of car among other types of cars in an advertisement. By filling in a knowledge gap in a customer journey, a model based thereon can then be used to better predict (e.g., may execute the act of predicting) the likelihood of a future incident, thus providing a continuous assessment and management of customer journeys.

Training these models with diverse event data, possibly from a variety of sources, is expected to enrich their ability to address as many different types of product, service, and customer service offerings, system components, and workflows or sections as are contained in the training data.

In some embodiments, a machine learning system (such as the Cerebri Value system, a recurrent neural network (like a LSTM network) or a Hidden Markov model (like a multi-stage model or a continuous-time model, or other dynamic Bayesian networks) works on (e.g., ingests and responds to) time series of events (steps) leading to reference events by assigning relative weights to each event on the series to reflect their relative contributions to the occurrence and magnitude of reference events. The assignment may be based on information contained in a large number of time series similar to the one under examination. The system thus provides information for events positioned in a time series prior to, or between reference events. In some embodiments, the model applies a transformer architecture (like an autoencoder with attention) a or Bayesian Optimization suitable for optimization of systems with expensive (or non-differentiable) cost functions to strike a balance between exploration and exploitation, like that described by Brochu et al, "A Tutorial on Bayesian Optimization of Expensive Cost Functions, with Application to Active User Modeling and Hierarchical Reinforcement Learning," December 2010, arXiv:1012.2599 [cs.LG], the contents of which are hereby incorporated by reference.

The above-mentioned aspects and other aspects of the present techniques will be better understood when the present application is read in view of the following example embodiments.

In some embodiments, customer journeys (CJs) are used to organize information about the way customer interact with businesses. Customer journeys may be discrete, unevenly sampled time series of customer events that contain a heterogeneous set of attributes and features. They may contain both unambiguous signals of commitment—like buying a new car—as well as more ambiguous signals of commitment, such as a monthly series of credit card purchases or contact with customer service. CJs improve machine learning performance whether for recommendation systems and for customization of experience. CJ based Machine Learning (CJML) can use a set of memory-aware machine learning techniques that are adaptive to business and consumer circumstances.

In some embodiments, CJML is flexible because a timeline organization allows the introduction of causal relationship between events while allowing for correlation approaches. It allows the leverage of multiple sources of touch points between consumer and business (inbound from consumer to business and outbound from business to consumers). CJML allows the use of time-series data (like billing), events on regular or irregular time grid, synthesized events, marketing events that might be observed or not by consumers, directly observed or hidden events.

In some embodiments, determining a next datapoint that minimizes a particular uncertainty or error (e.g., a knowledge gap) bridges an important gap in both the management of surveying and customer journeys. In the context of this application, a next data point or next best data point (e.g., a next data point that maximizes reduction in a knowledge gap relative to one or more other data points) may include a question or a next best question in a customer journey.

In some embodiments, the next best question (NBQ), (a term which is used to refer both to the question, and the set of computational acts by which the next best question is determined, emitted, and a response is processed, in some embodiments, as will be evident from context) seeks to find from a customer a piece of information that will improve the information content about said customer, his/her journey, for the purpose of segmentation or more importantly for the specific improvement of a key performance indicator (KPI). The improvement of the KPI, in some embodiments, can directly attributable to the response (e.g., answer) to the question or indirectly (e.g., not receiving a response). The KPI, in some embodiments, can be contemporaneous (as in increase the probability of making a sale) or cumulative (as in increase lifetime value (LTV)). NBQ may be enabled by the power of Artificial Intelligence. It, in some embodiments, can be used to enhance bias detection in AI model as described in U.S. patent application Ser. No. 15/595,220, titled DETECTING AND REDUCING BIAS (INCLUDING DISCRIMINATION) IN AN AUTOMATED DECISION-MAKING PROCESS, the contents of which are incorporated by reference herein in their entirety.

In some embodiments, NBQ can be used in a multitude of circumstances. It is especially helpful in circumstances when a journey cannot be attributed to a specific customer. This is the case if a consumer uses a web site without logging in or if the data management platform (DMP) identification (ID) of the consumer is not a relevant one (e.g., one user using another user's device/account/other identifiable information). This is the majority of interaction online, even for e-commerce.

Knowledge about a consumer or user is expected to assist with creating the best recommendation or personalization experience. There are, at any moment in time, knowledge gaps about the customer. These gaps can be qualitative or quantitative in nature, or both. This can include whether a consumer is male or female, received an offer from a competitor, is shopping for his/herself or for another purposed (e.g., the office, another person, etc.), an identity of the consumer itself (either as a DMP ID or in the world), etc.

Because what matters is the journey of a customer rather the customer itself (whose identity might be unknown), what matters is the Customer Journey Knowledge Deficit (CJKD) the business party has at a moment in time (and channel) interfacing with the consumer. The smaller the CJKD, the more the business knows relevant information about the customer journey. The gap can be measured as a distance or pseudo-distance using a multitude of tools including, but not limited to (which is not to suggest that other lists are limiting), cosine distance, Manhattan distance, dictionary distance on multidimensional data, Levenstein distance, Mahalanobis distance.

NBQ, in some embodiments, affords a way to reduce the CJKD on a dynamic basis. Different CJKD measures are available based on the purpose. Some are based on principle of market segmentation, others on gamification, others on information theory, others on game theory.

NBQ, in some embodiments, can implemented as a KPI goal/CJKD criterion/place/time/question/reward/answer septuplet. In some embodiments, aspects of this septuplet can be derived from regression analysis, business rules, machine learning among others.

In some embodiments, NBQ generates a question for maximum reduction of CJKD. In some embodiments, NBQ generates a question to reduce an aggregate CJKD. In yet another embodiment, the NBQ is generated to reduce the CJKD regardless of the amount of reduction achievable. In yet another embodiment, the NBQ is chosen based on balancing the CJKD and the probability of consumer abandoning shopping or equivalent activity.

Because a customer might not respond to a NBQ, some embodiments account for the probability of the customer responding (Pr) as part of the objective. The product of Pr times CKD is an effective CKD, dubbed in an ECKD. In various embodiments, an ECKD and CKD may be treated in a similar manner.

There are multiple business performances that can be optimized by various embodiments. Among those, identify likely vehicle repurchasers, accelerate consumers (also referred to herein as customers or users) earning capabilities as well as their redemption of the program i.e. accelerate earn & burn, automatic assignment of client to agent/floor person, best action for identified likely vehicle purchaser to accelerate purchase events, best action for upselling customer to higher class vehicle/more expensive, classify dealers based on quality of loan, cluster customers based on household info and demographic postal code to analyze car purchase/service behavior, income, spending patterns, convert from term life insurance to universal life insurance, convert lease to lease or lease to purchase, corrective recommendation per event type (best action), create and drive triggers and targeted messaging to customers, create behavior driven anthropological cohorts, create incentive for purchase at household level, create lead customers and cohorts for businesses, create leads for repurchase of vehicles, create leads for specific models, create new service plans, design of heuristics (machine learning drives creation of business rules), determine when a second credit card is being used, determine when card rates need to be changed, dynamic credit terms for credit cards, dynamic fee for business, earn and burn, extend range of people to bring car to dealer after 3 years, extend range of people to bring car to dealer before 3 years, faster auto-decline of non-prime loans, find ways to drive a better connection and experience between credit card product and the loyalty programs, including fit to card, based on spend, redemption, behavior and experience, forecast vehicle sales/market share by month, generate best action for recovering customers base on identified event type, identify events in customer journey negative impact, increase brand commitment, identify impact of different series of marketing campaigns, identify likely candidates for renewal of service plan, identify likely candidates for upgrade of service plan, identify likely vehicle purchasers, identify the most effective medium for service renewal, impact of follow up call for recovery of customers, improve book to approve ratio, improve book to look ratio car, improve conversion of new businesses, improve risk adjusted return (RAR) on loan, minimize prepayments, improve the timing and relevancy of communications throughout the journey, incentives to purchase vehicles for customers who are currently leasing, increase automatic approval, increase booking while maintaining the same risk profile, increase booking while reducing delinquency rate, increase loan approval, increase loan approval and booking, increase number of businesses signing for loyalty, lease renewal model, level of discount for purchase, leverage multiple consumers in the same household, loan configuration management, manage cash incentives, mortgage, offer optimization, optimal incentive across a/b/c test, optimization of the bonus/promotion to dealers, optimize money cash back, optimize the move to subscription models, optimizes the onboarding and first 365 days of a new customer, portfolio risk analysis, predict when loan is being flipped, prepayment prediction/velocity, prioritization of processing in manual approval process for underwriting: that is queue management, product definition based on composite/atomic attributes, provide upper bound of incentive to MRSP ratio, rank customers who are likely to return lease and not purchase, rank leads for high cost outbound channels e.g. call center, rank method for call center general reach out (best action), rank upselling customer to higher class vehicle/more expensive, recommend good shepherd payment, recommend redemption, recommendation to engage for service visit, reduce amount of time required to approve a loan, reduce the number of retransmits to approach desk for non-prime loan application, reducing "going dark", ride sharing, selection extended warranty, service package definition, size the universal life insurance premium (ability to save/pay), support the move from an offer driven model to an experience driven model, tailor incentive, tailored offers for customers, total incentive for repurchase, total incentive for repurchase per area, understand the critical factors, events and outcomes of each customer's journey, understand the factors and events throughout the journey of a business prospect from: lead generation>lead qualification>lead nurturing>lead conversion, up-lease to higher class of vehicle/more expensive, when/what underwriter communicating to dealer during stages of the approval process, recommend options for wealth management, reduce abandon of basket.

In some embodiment, incentives are added to the NBQ to entice the customer to answer the question. These incentives that may be proposed or offered include, but are not limited to, matters related to advertising, lead generation, affiliate sale, classifieds, featured list, location-based offers, sponsorships, targeted offers, commerce, retailing, marketplace, crowd sourced marketplace, excess capacity markets, vertically integrated commerce, aggregator, flash sales, group buying, digital goods, sales goods, training, commission, commission per order, auction, reverse auction, opaque inventory, barter for services, pre-payment, subscription, brokering, donations, sampling, membership services, insurance, peer-to-peer service, transaction processing, merchant acquiring, intermediary, acquiring processing, bank transfer, bank depository offering, interchange fee per transaction, fulfillment, licensing, data, user data, user evaluations, business data, user intelligence, search data, real consumer intent data, benchmarking services, market research, push services, link to an app store, coupons, digital-to-physical, subscription, online education, crowd sourcing education, delivery, gift recommendation, coupons, loyalty program, alerts, and coaching.

In some embodiments, the question may be selectively inserted as part of the user interface the consumer is using to interact with a business (part of a web page on a browser), a screen in a mobile app. It can be a field requested as part of a customer interface in a DMP, CRM, DMS where the business staff asks the consumer a question prompted. The question can be placed in different channel than the primary channel of interaction. some embodiments, a question may be posed in other ways, such as by way of advertising, which may include interactions with or with portions of product advertising, brand advertising, 3rd party reviews (e.g., car X rated as top in its class, best sports cars, etc.), 3rd party advertising (e.g., 3 things to know about before buying a new car this year, best times to buy a car, and so on), etc., for which user interactions therewith (or not) are considered as answers to the question.

In some embodiments, the selection of the question is from a set of questions established by the operator of the business based on audience or segmentation principles. This may implement best action selection as described in U.S. patent application Ser. No. 16/127,933 titled MULTI-STAGE MACHINE-LEARNING MODELS TO CONTROL PATH-DEPENDENT PROCESSES, the contents of which are hereby incorporated by reference in their entirety.

The NBQ, in some embodiments, might be presented on a different physical screen from the main screen the consumer is using. In some embodiments, the NBQ is presented in a smart watch while the principal interaction is on a smartphone, and then NBQ may be determined, and caused to be sent to such a device from a remote computing system, like in a data center.

In some embodiments, a non-response to an NBQ (like the consumer cancel) is itself a response. In some embodiments, a delayed response to an NQB is itself a response or feature of a response. This is especially helpful when using NBQ as part of a reinforcement learning.

In some embodiments, the knowledge deficit can be computed across customers interfacing with the system concurrently (within the resolution of the relevant business operation cycle).

Timing of the NBQ can also be optimized. By timing, event location in a time series may be tracked and question event proposition optimized in the customer journey. Some embodiments determine at what step or after one step in the customer journey the NBQ is prompted. Some embodiments determine the amount of time since the step in the customer journey the NBQ is prompted. This can be used for idle time management, in some cases.

In some embodiments, a day in the week and time in the day may also be used for deciding what NBQ to present, and the time may be determined based on prior events occurring at those days/times in the customer journey.

In some embodiments, the NBQ is timed to align with the next regular event in a time series used to develop machine learning or regression analysis such as, but not limited to (which is not to suggest that other descriptions are limiting) ARIMA or reinforcement learning.

The physical or logical location may also be used for deciding what NBQ to present.

The question can be in the form of text, video, audio, multimedia, or haptic, among others.

The question presented can be chosen from a set of questions set in a repository or dynamically composed. The questions elements (media, look and feel, references) are based on attributes associated with events, factors, demographic information, risk, actions, performance functions, utility functions, parameter of algorithms, labeling of features, labeling of outcomes, operation research policy terms, portfolio constraints, features of products or services offered (including by not limited to pricing, discount, MSRP, discount relative to MSRP, incentives).

In some embodiments, different measurements are utilized to ascertain knowledge and thus knowledge deficit (KD) about customer journeys and customers that can be used to optimize the NBQ.

In some embodiments, the CJDK is the lack of information about a feature engineering attribute that drives performance of a recommendation engine.

In some embodiments, the CJDK is the lack of information about a feature that moves the knowledge about an object related to the customer journey to a greater level of precision in an ontology.

In some embodiments, the CJDK is the lack of information about a SHAP feature.

In some embodiments, the CJKD is the number of branches in the expected reminder of the customer journey represented as a tree.

In some embodiments, the CJKD is the uncertainty associated with the probability distribution of a possible future event or outcome.

In some embodiments, the CJKD is the entropy associated with the probability distribution of a possible future set of event or outcomes.

In some embodiments, the CJKD is the variance of the impact of a KPI (Key Performance Indicator).

In some embodiments, the CJKD is a lack of discriminatory power that can be achieved between different possible outputs of a recommender system. Non-limiting examples include affinity based matching models between customers and products, or the recommendations of future actions to optimize a defined KPI.

In some embodiments, the CJKD is the missingness present in features that are being utilized to perform the estimation of a KPI.

In some embodiments, the NBQ is chosen to illicit one or more attributes that would provide the richest set of derivative features engineered downstream.

In some embodiments, the NBQ is chosen to illicit one or more attributes that would drive maximum probability of assignment to a specified cluster.

Figure 3:
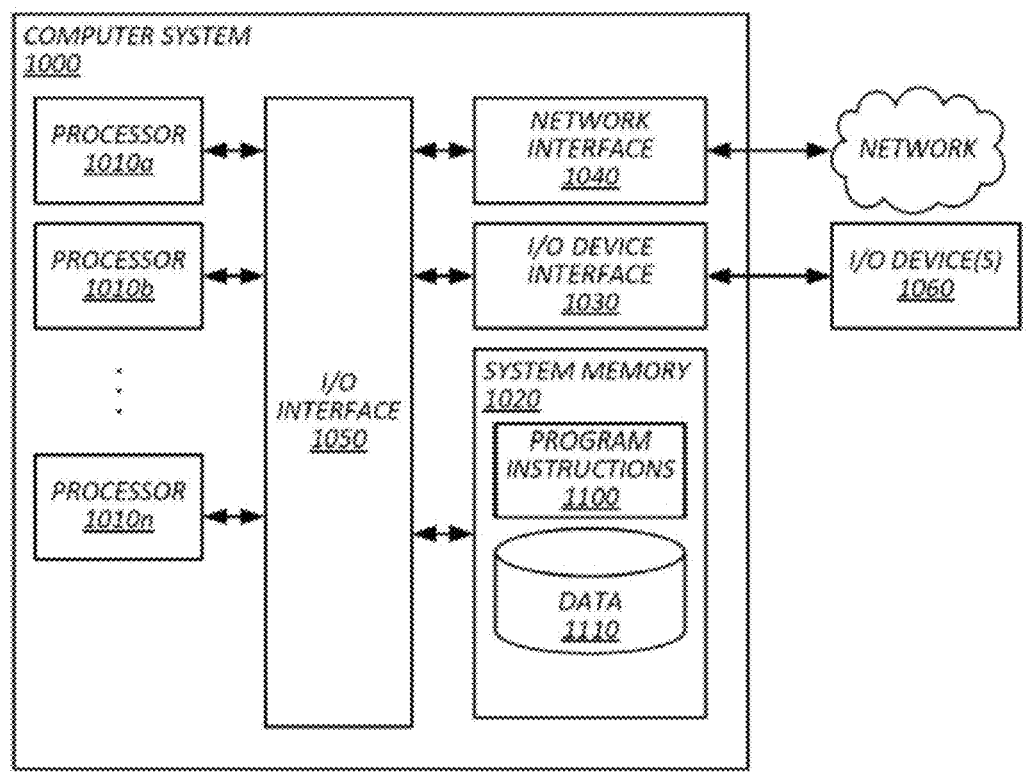
FIG. 3 illustrates an example of a computing device upon which the present techniques may be implemented.

FIG. 3 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000. For example, the computing system 1000, components thereof, or a collection of computing systems, may be operable to perform one or more operations and/or included in one or more entities to perform those functions. For example, computing systems like computing system 1000 may be utilized to store and process data like that illustrated with respect to FIGS. 2 and 3 and may be organized in an architecture like that illustrated in FIG. 3. Thus, one or more computing systems 1000 may be utilized to perform operations with respect to customer journey management, such as determining knowledge deficits, determining data points or questions to minimize knowledge deficits or other KPIs, and the like, using techniques disclosed herein. Example elements of an example computing system are discussed in greater detail below.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Figure 4:
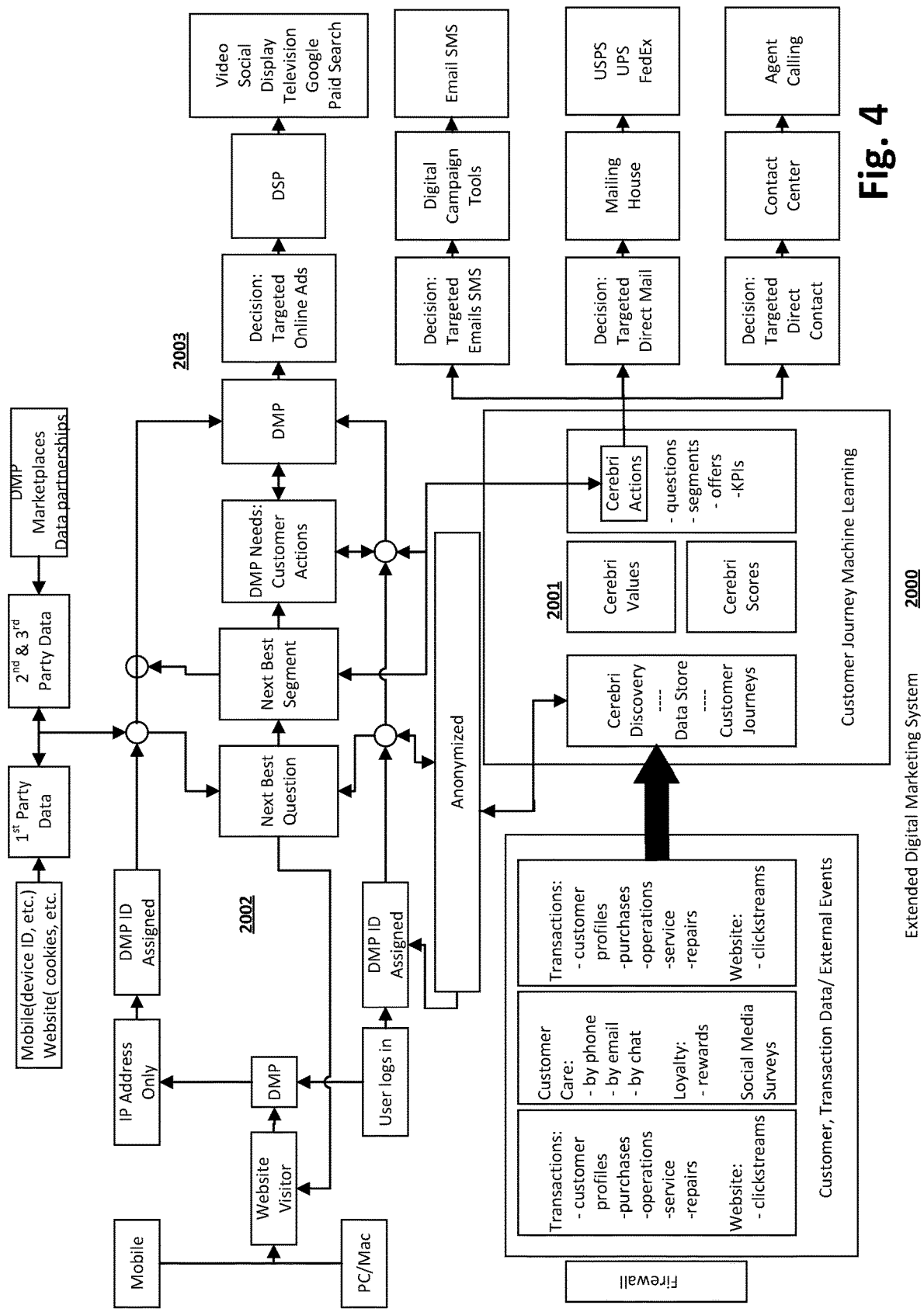
FIG. 4 is a block logical architecture that illustrates an extended system for determining a next data point, according to an example embodiment.

FIG. 4 illustrates an example embodiment using the NBQ in an extended marketing system 2000. The machine learning system 2001 may generates an NBQ 2002 for processing by DMP 2003.

Figure 5:
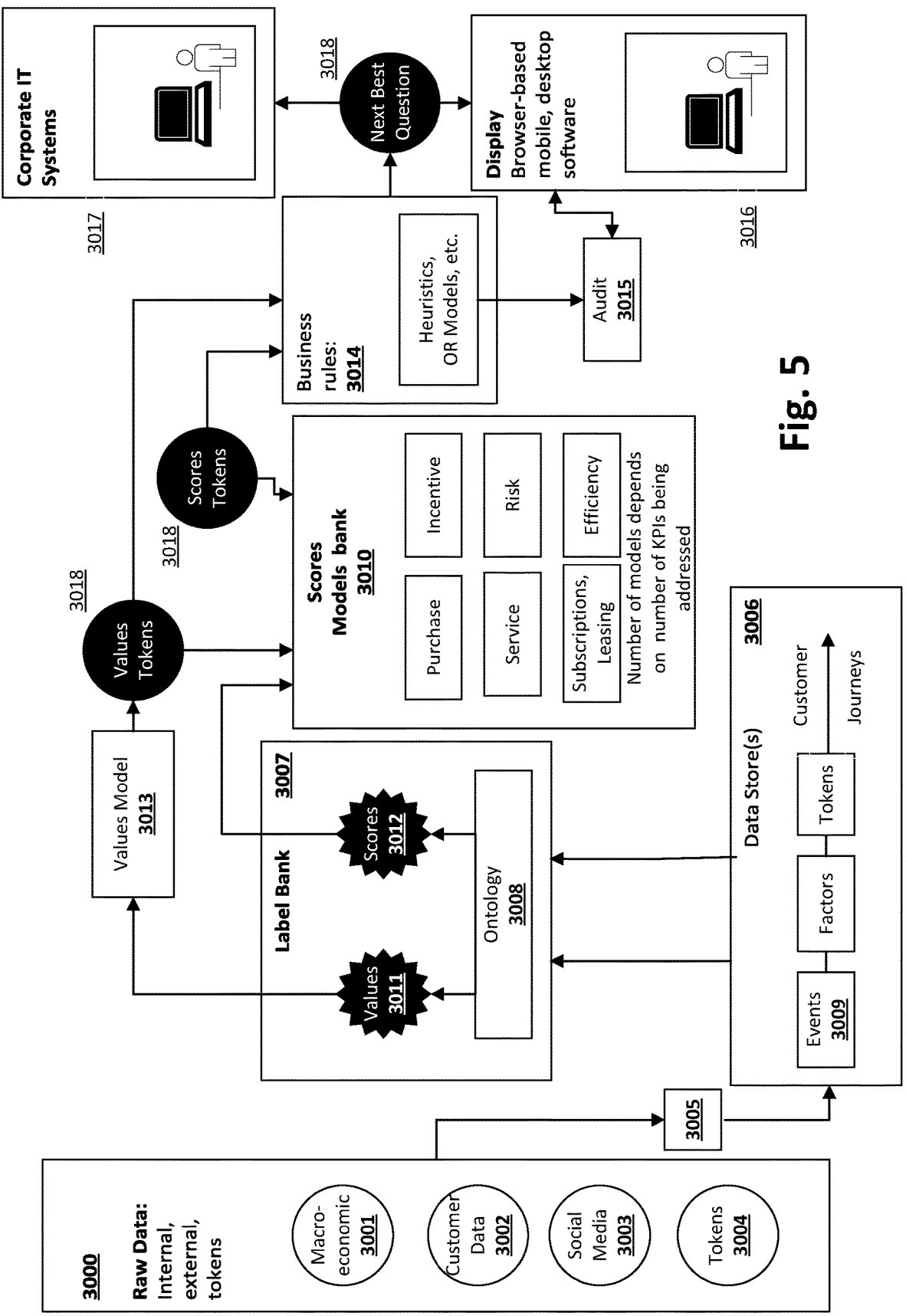
FIG. 5 a block logical architecture that illustrates an example flow diagram for determining a next data point, according to an example embodiment.

FIG. 5 illustrates an exemplary flow in accordance with embodiments of the present technique. Raw data 3000 feed into the system can include, in a non-limiting way (which is not to suggest that other descriptions are limiting), macro-economic data 3001 that can be common to multiple models, customer data 3002 gathered by entities governments, enterprises, NGOs, companies, franchises, federations, corporations, 2nd parties, 3rd parties, social data 3003, and tokens 3004. The ETL module 3005 may performs a series of tests and processes to ensure (or increase the likelihood) that the data from the raw storage 3000 is properly set in the data store 3006. The data store can include one or more data sets from one or more companies. The algorithms in the ETL module can include hard tests such as table key/join key, expected counts, date continuity check, time series, continuity check, data type check, out of sample value check, covariate shift. The abstraction of the relevant information is performed in the label bank 3007, driven by the domain knowledge kept in the ontology 3008. This knowledge may allow for model class level of events, factors, and customer journeys. This include lumping of different events in a meta-event for the purpose of training a model, application of a model to a data set, or presentation. The labels kept in the label bank may be logically associated with the events 3009 internal labels. This may allow for an abstracted view in the label bank of the features in the data stores. To implement one of the models in the model bank 3010, the system may select the correct labels into ontology 3008, values 3011, and scores 3012. Models may be run using an optimized selection of modeling techniques in the system. It should be noted that the models can be run at any time a data store has been properly set, in some embodiments. The model classes and core models can be the same for all data stores, that is common across multiple customers, in some embodiments. This is possible in some cases because they call on labels, scores, and values kept in the label bank. The outputs of the values model 3013 may be used by the model bank 3010 to run said the model appropriate for the business objectives sought including the generation of Next Best Action to reduce the knowledge gap about the customer. Business and policy rules may then be applied 3014. Results, support information, and audits may be stored in audit store 3015. The outputs may be consumed internally on a web app or mobile application 3016 or directly to a corporate system/CRM/Dealer Management System or other execution system 3017. The NBQ 3018 may then be output to the appropriate system.

Models may be trained with various, model-appropriate, training algorithms, including Baum-Welch, gradient descent, and the like, examples of which are noted below. In some embodiments, models are trained by a background offline task using one or more machine learning techniques (e.g., model-appropriate training algorithms). For example, models may be trained to generate the elements of the NBQ for a customer, a set of customers, an audience of customers, among others. The machine learning techniques that can be used in this system include the following: Hidden Markov Models (HMI), Baum-Welch gradient descent, Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Topological Data Analysis (TDA), Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC) Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models. In some embodiments, these models can be used individually or collectively as an orchestration as described by are described in U.S. Patent Application 62/856,713/595220, titled OBJECT ORIENTED AI MODELING, the contents of which are incorporated by reference herein in their entirety. These models can be further orchestrated with Operational Research such as Linear Programming, Simplex Algorithm, Integer Programming, Inventory Models, Deterministic Dynamic Programming, Genetic Algorithm, Simulated Annealing.

In some embodiments, some or all of the weights or biases of a recurrent neural network (or other models) described herein may be calculated by executing a machine learning algorithm on a training set of historical customer journeys. Some embodiments may execute a gradient descent optimization to reduce the error rate and select appropriate weighting and the bias values. In some cases, a predictive model (e.g., a vector of weights) may be calculated as a batch process run periodically. Some embodiments may construct the model by, for example, assigning randomly selected weights or biases; calculating an error amount with which the model describes the historical data and a rates of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or biases, may be stored in memory and later retrieved for application to new calculations on newly calculated risk scores. In some cases, cyclic loops in the network may be unrolled during training.

Some embodiments may execute a Hidden Markov Model. In some cases, each hidden state may be mapped to a corresponding event, question, or KPI. In some embodiments, the model may be trained with the Baum-Welch algorithm, and the risk may be inferred with the Viterbi algorithm. In some cases, a subset of the training set may be withheld in each of several iterations of training the model to cross validate the model. The model may be trained periodically, e.g., monthly, in advance of use of the model.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, a first training dataset, wherein: the first training dataset comprises a plurality of subject-entity records, the subject-entity records each describe a different subject entity; each subject entity is a different member of a first population of entities that have interacted over time with an actor entity; each subject-entity record describes attributes of a respective subject entity among the first population; each subject-entity record describes a time-series of events involving a respective subject entity among the first population; the events are distinct from the attributes; at least some of the events are question events that are caused by the actor entity; and at least some of the events are subject responses that are caused by a respective subject entity among the first population; training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population; obtaining, with one or more processors, a set of candidate question sequences including candidate question events to be potentially answered by the actor entity, the set including a plurality of different candidate question sequences; forming, with one or more processors, virtual subject-entity records by appending the set of candidate question sequences to time-series of at least some of the subject-entity records, wherein: a given subset of the virtual subject-entity records includes a plurality of virtual-subject entity records that each include at least part of a time-series from the same subject-entity record in the first training dataset; and at least some of the plurality of virtual-subject entity records in the given subset each have a different member of the set of candidate question sequences appended to the at least part of the time-series from the same subject-entity record in the first training dataset; forming, with one or more processors, a second training dataset by: predicting responses of the subject entities to at least some of the set of candidate question sequences with the first machine-learning model based on the virtual subject-entity records; and associating subject entities or attributes thereof with corresponding predicted responses in the second training dataset; training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the second machine-learning model in memory.

2. The medium of embodiment 1, wherein: at least some of subject-entity records of the plurality of subject-entity records have interacted within a time range with the actor entity.

3. The medium of embodiment 2, wherein the time range is a trailing time range.

4. The medium of embodiment 1, wherein: the first machine-learning model is configured to predict responses of the plurality of subject-entity records given previous time-series of events and attributes of the plurality of subject-entity records.

5. The medium of embodiment 1, wherein the operation comprise: iterating training of a plurality of models to increase the accuracy of the model across each iteration responsive to next questions and responses.

6. The medium of embodiment 1, wherein: the first machine learning model comprises a Hidden Markov model.

7. The medium of embodiment 1, wherein: the first machine learning model comprises a long short-term memory model.

8. The medium of embodiment 1, wherein: the first machine learning model comprises a dynamic Bayesian network.

9. The medium of embodiment 1, wherein: the first machine learning model comprises a neural network classifier.

10. The medium of embodiment 1, wherein: the second machine learning model is an unsupervised model configured to translate inputs into a vector representation that maps to a candidate action.

11. The medium of embodiment 1, wherein: the second machine learning model is a random decision forest model that includes a plurality of weighted trained decision trees.

12. The medium of embodiment 1, wherein: the second machine learning model is a gradient-boosted trees model that includes a plurality of weighted trained decision trees.

13. The medium of embodiment 1, wherein: training the first machine-learning model comprises steps for training a supervised time-series forecasting model; and training the second machine-learning model comprises steps for training a supervised classification model.

14. The medium of embodiment 1, wherein: the operations comprise steps for causing subject entities to respond in a targeted manner based on a trained model.

15. The medium of embodiment 1, wherein: the events are stored in an ontology of event types that describes interrelatedness or similarity between the events.

16. The medium of embodiment 1, wherein the question events comprise: an interactive user interface element for which a response within the interactive user interface element is collected, which may be a selection or other user input; an advertisement, for which a response may be the interaction with a particular portion of the advertisement; and an article about a product, for which a response may be the interaction with a particular portion of the article.

17. The medium of embodiment 1, wherein at least some of the events are subject responses that are caused by a respective subject entity among the first population.

18. The medium of embodiment 17, wherein the subject responses comprise: a canceled response; a direct response; and an indirect response.

19. The medium of embodiment 1, wherein at least some of the plurality of virtual-subject entity records in the given subset each have a different member of the set of candidate question sequences appended to the at least part of the time-series from the same subject-entity record in the first training dataset.

20. The medium of embodiment 1, wherein: at least some of subject-entity records of the plurality of subject-entity records have interacted within a geolocation range with the actor entity.

21. A method, comprising: the operations of any one of embodiments 1-20.

22. A system, comprising: one or more processors; and memory storing instructions that when executed by the one or more processors effectuate operations comprising: the operations of any one of embodiments 1-20.

What is claimed is:

1. A method comprising:
   obtaining, by a computing system, a first training dataset, wherein:
      the first training dataset comprises a plurality of subject-entity records, the subject-entity records each describe a different subject entity;
      each subject entity is a different member of a first population of entities that have interacted over time with an actor entity;
      each subject-entity record describes attributes of a respective subject entity among the first population;
      each subject-entity record describes a time-series of events involving a respective subject entity among the first population;
      the events are distinct from the attributes and the events have respective event types stored within an ontology of event types;
      at least some of the events are question events that are caused by the actor entity; and
      at least some of the events are subject responses that are caused by a respective subject entity among the first population;
   training, by the computing system, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population;
   obtaining, by the computing system, a set of candidate question sequences including candidate question events, the set including a plurality of different candidate question sequences, wherein the subject entities of the first population respond to candidate question events via interactive user interface elements;
   forming, by the computing system, virtual subject-entity records by appending the set of candidate question sequences to time-series of at least some of the subject-entity records, wherein:
      a given subset of the virtual subject-entity records includes a plurality of virtual-subject entity records that each include at least part of a time-series from the same subject-entity record in the first training dataset; and
      at least some of the plurality of virtual-subject entity records in the given subset each have a different member of the set of candidate question sequences appended to the at least part of the time-series from the same subject-entity record in the first training dataset;
   forming, by the computing system, a second training dataset by:
      predicting responses of the subject entities to at least some of the set of candidate question sequences with the first machine-learning model based on the virtual subject-entity records; and
      associating subject entities or attributes thereof with corresponding predicted responses in the second training dataset;
   training, by the computing system, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses;
   storing, by the computing system, the adjusted parameters of the second machine-learning model in memory; and
   using, by the computing system, the adjusted parameters of the second machine-learning model to select questions for a given subject entity, wherein the selected questions reduce a knowledge gap of the actor entity regarding the given subject entity's behavior.

2. The method of claim 1, wherein:
   at least some of subject-entity records of the plurality of subject-entity records have interacted within a time range with the actor entity.

3. The method of claim 2, wherein the time range is a trailing time range.

4. The method of claim 1, wherein:
   at least some of subject-entity records of the plurality of subject-entity records have interacted within a geolocation range with the actor entity.

5. The method of claim 1, wherein:
   the first machine-learning model is configured to predict responses of the plurality of subject-entity records given previous time-series of events and attributes of the plurality of subject-entity records.

6. The method of claim 1, further comprising:
   iterating training of a plurality of models to increase the accuracy of the model across each iteration responsive to next questions and responses.

7. The method of claim 1, wherein:
   the first machine learning model comprises a Hidden Markov model.

8. The method of claim 1, wherein:
   the first machine learning model comprises a long short-term memory model.

9. The method of claim 1, wherein:
   the first machine learning model comprises a dynamic Bayesian network.

10. The method of claim 1, wherein:
    the first machine learning model comprises a neural network classifier.

11. The method of claim 1, wherein:
the second machine learning model is an unsupervised model configured to translate inputs into a vector representation that maps to a candidate action.

12. The method of claim 1, wherein:
the second machine learning model is a random decision forest model that includes a plurality of weighted trained decision trees.

13. The method of claim 1, wherein:
the second machine learning model is a gradient-boosted trees model that includes a plurality of weighted trained decision trees.

14. The method of claim 1, wherein:
the events are stored in an ontology of event types that describes interrelatedness or similarity between the events.

15. The method of claim 1, wherein the question events comprise:
an interactive user interface element for which a response within the interactive user interface element is collected, which may be a selection or other user input;
an advertisement, for which a response may be the interaction with a particular portion of the advertisement; and
an article about a product, for which a response may be the interaction with a particular portion of the article.

16. The method of claim 1, wherein at least some of the events are subject responses that are caused by a respective subject entity among the first population.

17. The method of claim 16, wherein the subject responses comprise:
a canceled response; a
delayed response;
a direct response; and
an indirect response.

18. The method of claim 1, wherein at least some of the plurality of virtual-subject entity records in the given subset each have a different member of the set of candidate question sequences appended to the at least part of the time-series from the same subject-entity record in the first training dataset.

* * * * *

UNITED STATES PATENT AND TRADEMARK OFFICE
CERTIFICATE OF CORRECTION

| | | |
|---|---|---|
| PATENT NO. | : 11,416,896 B2 | Page 1 of 1 |
| APPLICATION NO. | : 17/352235 | |
| DATED | : August 16, 2022 | |
| INVENTOR(S) | : Alain Charles Briancon et al. | |

It is certified that error appears in the above-identified patent and that said Letters Patent is hereby corrected as shown below:

In the Specification

Column 22, Line 62, the occurrence of "(HMI)" should be replaced with --(HMM)--.

Signed and Sealed this
Fourth Day of October, 2022

*Katherine Kelly Vidal*

Katherine Kelly Vidal
*Director of the United States Patent and Trademark Office*